United States Patent [19]

Colman

[11] Patent Number: 4,984,378
[45] Date of Patent: Jan. 15, 1991

[54] LIGHTED EMBROIDERY HOOP APPARATUS

[76] Inventor: Margaret M. Colman, 14600 Fonmeadow #800, Houston, Tex. 77035

[21] Appl. No.: 485,034

[22] Filed: Feb. 26, 1990

[51] Int. Cl.$^5$ .................. D05C 1/00; D05C 1/02; D05C 1/04
[52] U.S. Cl. .................. 38/102.2; 38/102.1; 38/102; 38/102.3; 38/102.4
[58] Field of Search ............ 38/12, 102, 102.1, 102.2, 38/102.3, 102.4; 223/52; 19/106; 112/103; 434/88, 89, 370, 429, 430, 432; 362/31, 32, 89, 90, 33, 216, 367, 368

[56] References Cited

U.S. PATENT DOCUMENTS

| | | | |
|---|---|---|---|
| Re. 30,476 | 1/1981 | Jennen | 38/102.2 |
| 4,164,008 | 8/1979 | Miller | 223/52 |
| 4,173,201 | 11/1979 | Chao | 119/106 |
| 4,485,574 | 12/1984 | Bennetot | 112/103 |

FOREIGN PATENT DOCUMENTS 0651306 10/1928 France .................. 3/102.2

Primary Examiner—Werner H. Schroeder
Assistant Examiner—Ismael Izaguirre
Attorney, Agent, or Firm—Leon Gilden

[57] ABSTRACT

An apparatus including an outer hoop securable about an inner hoop to secure a web of fabric therebetween for embroidery thereof. The inner hoop includes lighting means directed interiorly thereof including an independent battery supply to effect illumination of the lighting means. The lighting means may include a series of bulbs formed within a central hollow cavity of the hoop, or alternatively may include an elongate, fiber optic transmission cable mounted through the inner hoop formed of translucent material.

8 Claims, 4 Drawing Sheets

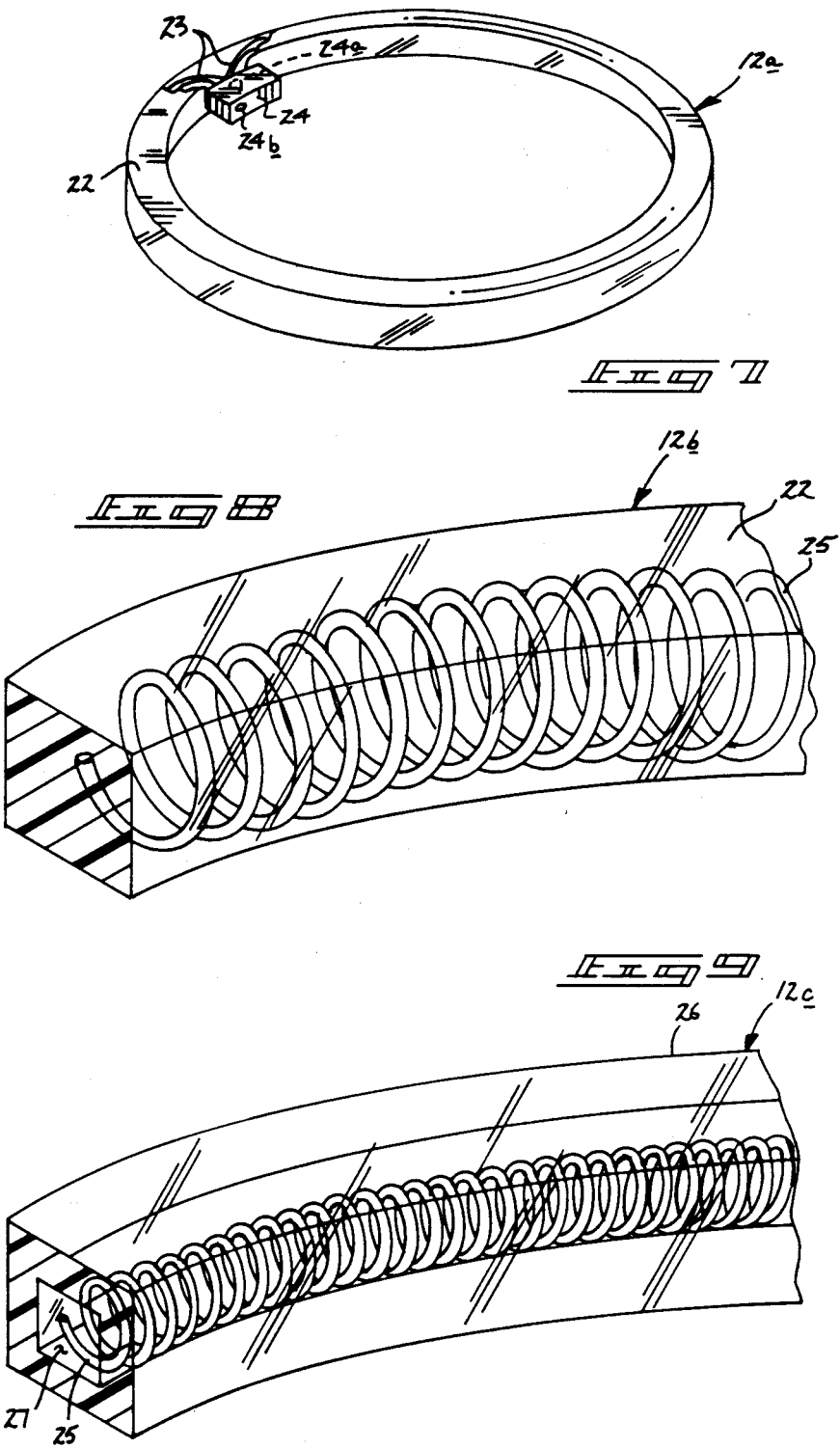

LIGHTED EMBROIDERY HOOP APPARATUS

BACKGROUND OF THE INVENTION

1. Field of the Invention

The field of invention relates to embroidery apparatus, and more particularly pertains to a new and improved lighted embroidery hoop apparatus wherein the same permits selective illumination of a fabric web to the embroidered.

2. Description of the Prior Art

Embroidery apparatus of various types is well known in the prior art. Heretofore, however, illumination of the fabric web to be embroidered has not been effectively addressed by the prior art. Illumination of such a workpiece is desirable to permit ease of the embroidery process due to enhanced visual illumination of the working forum. Examples of the prior art include U.S. Pat. No. 4,164,008 to Miller illustrating the use of an illuminated hoop for securement between layers of fabric to enable illumination of the fabric, such as in a shirt or costume arrangement.

U.S. Pat. No. 3,906,647 to Bates illustrates an embroidery hoop for use in needlecraft and the like, with the hoop formed with a selectively adjustable clamping member to adjust tension about an inner hoop or ring.

U.S. Pat. No. 4,247,998 to Foss illustrates a further example of a plurality of embroidery hoops including interiorly extending lug members to provide support for a user's thumb during an embroidery procedure.

U.S. Pat. No. 4,173,201 to Chao, et al., illustrates the use of a collar for use about an animal such as a dog, wherein the collar is provided with illumination members.

U.S. Pat. No. 1,951,246 to Kirkpatrick illustrates a portable guilting apparatus providing a hoop structure for support of a fabric to enable an embroidery procedure to be effected.

As such, it may be appreciated that there continues to be a need for a new and improved lighted embroidery hoop apparatus wherein the same addresses both the problems of ease of use and effectiveness in the illumination of the embroidery working area and in this respect, the present invention substantially fulfills this need.

SUMMARY OF THE INVENTION

In view of the foregoing disadvantages inherent in the known types of embroidery apparatus now present in the prior art, the present invention provides a lighted embroidery hoop apparatus wherein the same permits selective illumination of a captured web of fabric for embroidery purposes. As such, the general purpose of the present invention, which will be described subsequently in greater detail, is to provide a new and improved lighted embroidery hoop apparatus which has all the advantages of the prior art embroidery apparatus and none of the disadvantages.

To attain this, the present invention includes an outer hoop securable about an inner hoop to secure a web of fabric therebetween for embroidery thereof. The inner hoop includes lighting means directed interiorly thereof including an independent battery supply to effect illumination of the lighting means. The lighting means may include a series of bulbs formed within a central hollow cavity of the hoop, or alternatively may include an elongate, fiber optic transmission cable mounted through the inner hoop formed of translucent material.

My invention resides not in any one of these features per se, but rather in the particular combination of all of them herein disclosed and claimed and it is distinguished from the prior art in this particular combination of all of its structures for the functions specified.

There has thus been outlines, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application , which is measured by the claims, nor is it intended to be limiting as to the scope of the invention in any way.

It is therefore an object of the present invention to provide a new and improved lighted embroidery hoop apparatus which has all the advantages of the prior art embroidery apparatus and none of the disadvantages.

It is another object of the present invention to provide a new and improved lighted embroidery hoop apparatus which may be easily and efficiently manufactured and marketed.

It is a further object of the present invention to provide a new and improved lighted embroidery hoop apparatus which is of a durable and reliable construction.

An even further object of the present invention is to provide a new and improved lighted embroidery hoop apparatus which is susceptible of a low cost of manufacture with regard to both materials and labor, and which accordingly is then susceptible of low prices of sale to the consuming public, thereby making such lighted embroidery hoop apparatus economically available to the buying public.

Still yet another object of the present invention is to provide a new and improved lighted embroidery hoop apparatus which provides in the apparatuses and methods of the prior art some of the advantages thereof, while simultaneously overcoming some of the disadvantages normally associated therewith.

Still another object of the present invention is to provide a new and improved lighted embroidery hoop apparatus wherein the same permits selective illumination interiorly of a hoop member utilized for embroidery of a fabric captured between the inner hoop and an outer hoop.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is an isometric illustration of the modified inner hoop, as illustrated in FIG. 6.

FIG. 8 is an isometric partial sectional view of a further modified inner hoop structure.

FIG. 9 is an isometric partial sectional view of a yet further modified inner hoop section as utilized by the instant invention.

DESCRIPTION OF THE PREFERRED EMBODIMENT

Figure 1:
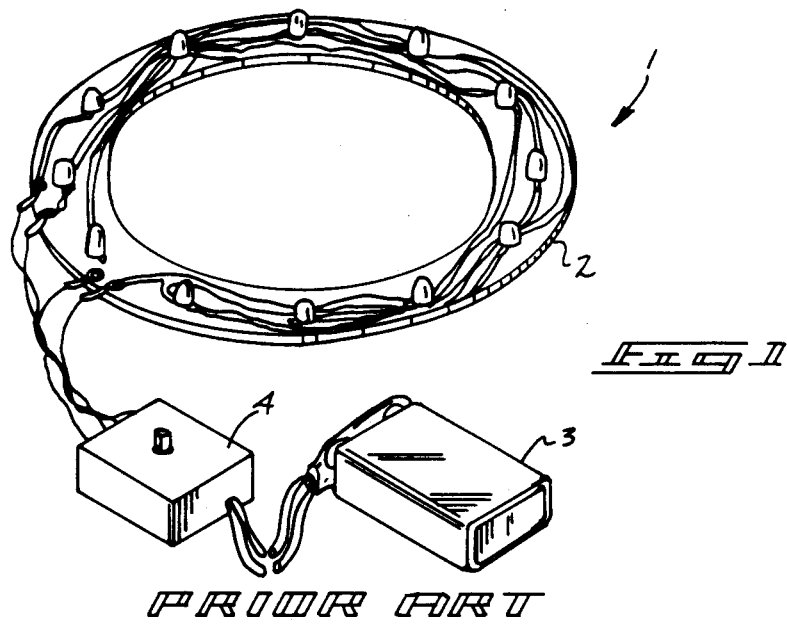
FIG. 1 is an isometric illustration of a prior art illumination ring.

With reference now to the drawings, and in particular to FIGS. 1 to 9 thereof, a new and improved lighted embroidery hoop apparatus embodying the principles and concepts of the present invention and generally designated by the reference numeral 10 will be described.

Figure 2:
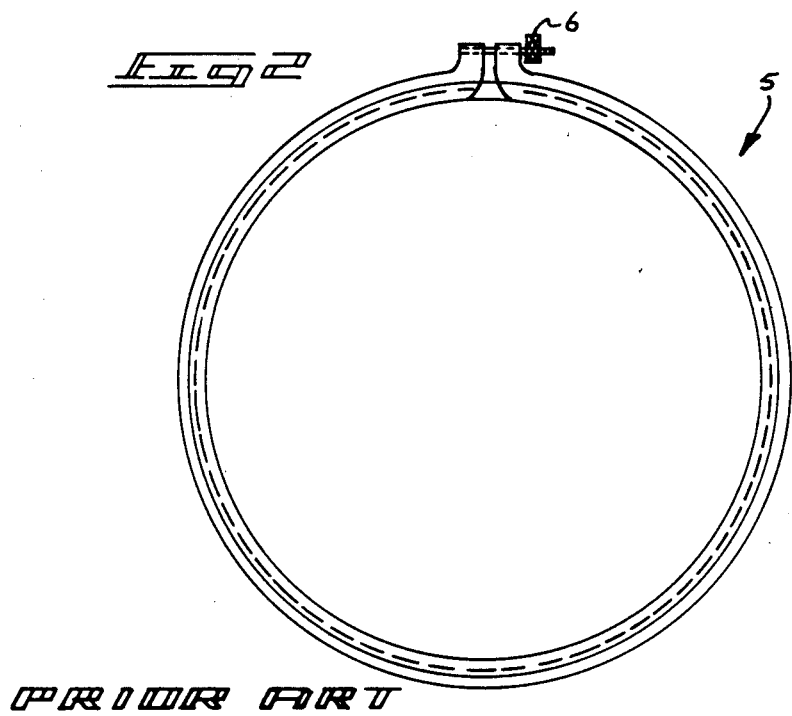
FIG. 2 is a top orthographic view of a prior art embroidery hoop structure.
Figure 3:
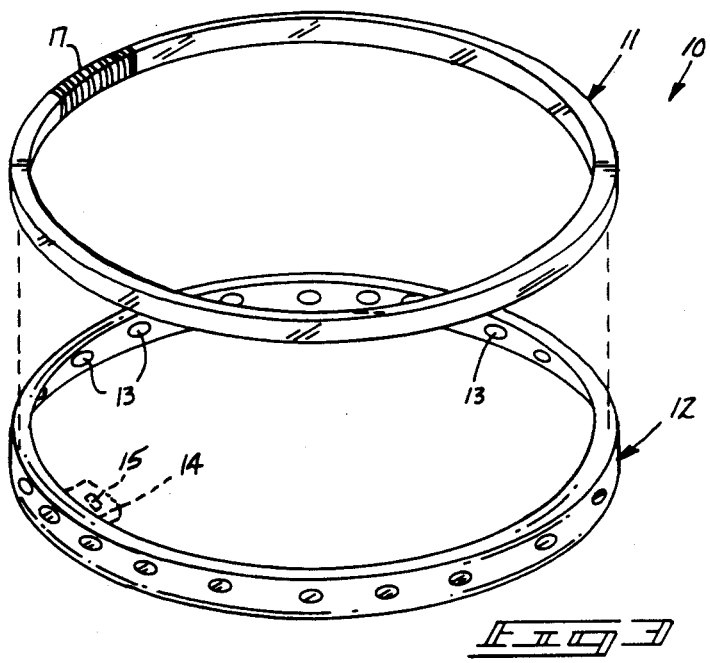
FIG. 3 is an isometric illustration of the instant invention.

FIG. 1 illustrates a lighted ring structure 1 utilizing an annular base 2 provided with a switching organization 4 and a battery supply 3. The organization is utilized for illumination of various garments and positioned in an underlying relationship relative to a garment for novelty illumination thereof. FIG. 2 illustrates an embroidery hoop structure 5, wherein the outer hoop includes an adjustment member 6 employing a threaded rod and knurled nut member to permit selective tensioning of the outer hoop of the embroidery structure.

Figure 4:
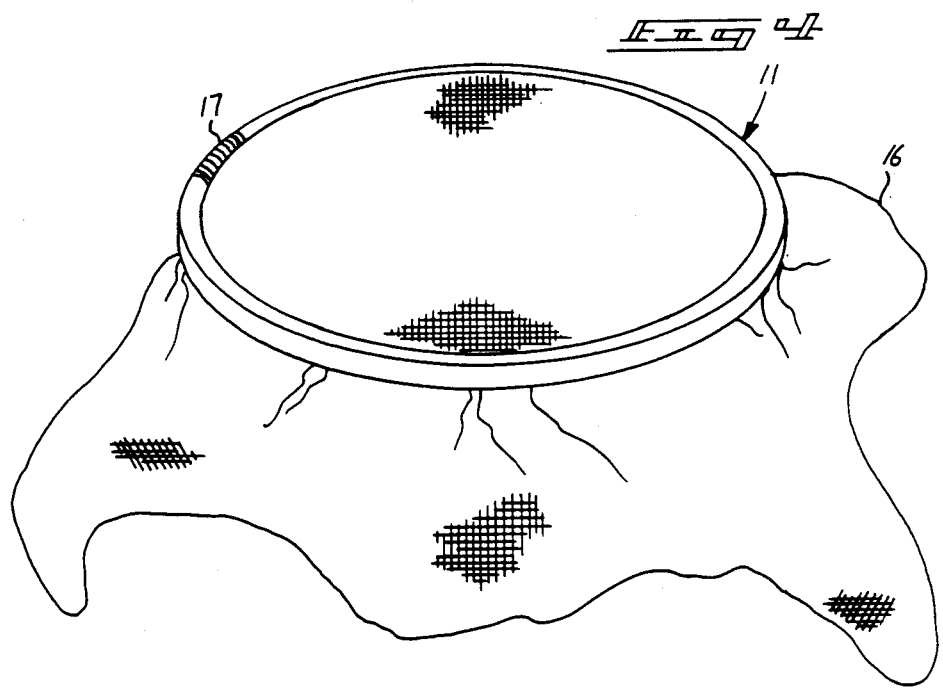
FIG. 4 is an isometric illustration of the instant invention capturing a web of fabric for embroidering.

More specifically, the lighted embroidery hoop apparatus 10 of the instant invention essentially comprises an outer hoop ring 11 defined by an internal diameter mounted in a sliding, aligned overlying surrounding relationship relative to the inner hoop ring 12 defined by an exterior diameter substantially equal to that of the interior diameter of the outer hoop ring 11. A fabric web 16 is secured between the outer and inner hoop ring to enable an embroidery procedure to be effected within the fabric web secured interiorly of the assembled outer and inner hoop rings, as illustrated in FIG. 4. An interior surface 13 of the inner hoop ring 12 includes a series of equally spaced elongate openings 13, each mounting an illumination bulb 21 (see FIG. 5) in electrical communication with each other interiorly of the inner hoop ring 12. A battery pack 14, including an associated switch 15, selectively directs current through an electrical transmission line 20 to each of the illumination bulbs 21. Securement lacing 17 secures terminal ends of the outer hoop ring 11 together to enable a varying of tension in securing the outer hoop ring overlying the inner hoop ring capturing the fabric web 16 therebetween.

Figure 5:
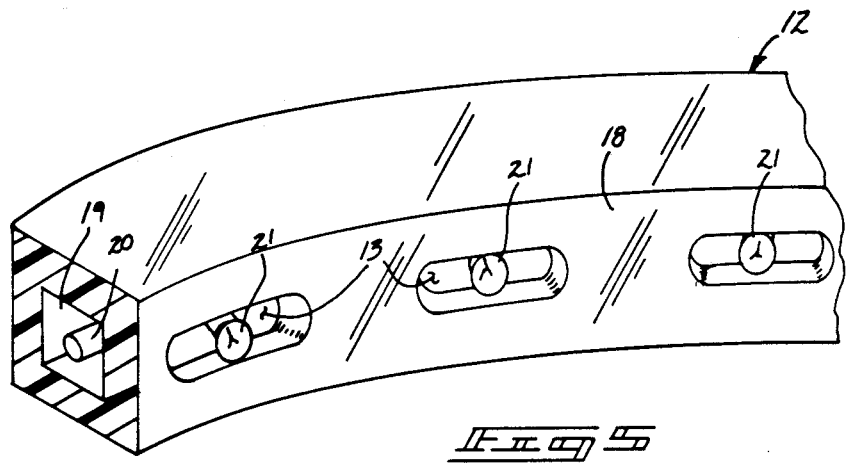
FIG. 5 is a cross-sectional view of the inner hoop, as illustrated in FIG. 3.

Reference to FIG. 5 illustrates that a forward interior annular surface 18 secures the elongate openings 13 at regularly spaced intervals projecting through the forward annular surface 18, with a central annular cavity 19 formed interiorly of the inner hoop ring 12 supporting the various bulbs 21 and electrical transmission line 20 therewithin.

Figure 6:
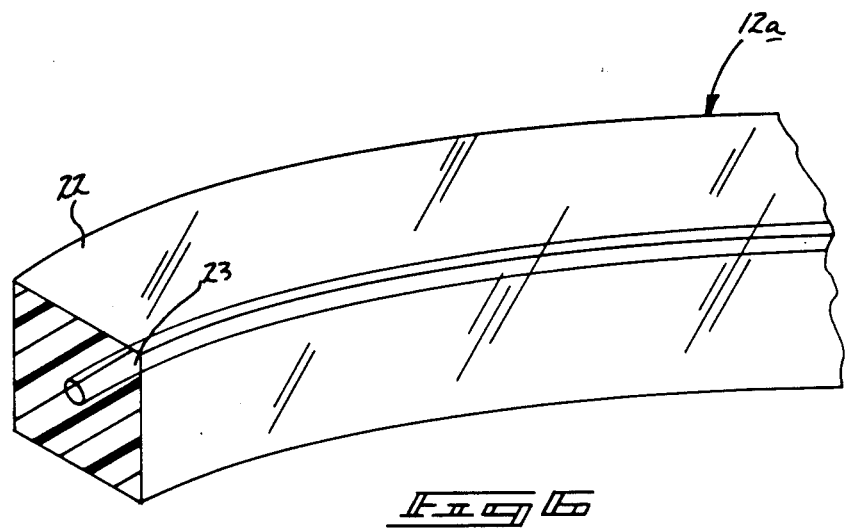
FIG. 6 is an isometric partial sectional view of a modified inner hoop as utilized by the instant invention.

FIG. 6 illustrates a modified inner hoop ring 12 defined as a solid annular ring 22 formed of a translucent polymeric material. A fiber optic cable 23 is embedded within the ring 22 for transmission of light directed from an illumination bulb 24a mounted within a battery compartment 24, including a switch member 24b to direct illumination through the fiber optic cable 23 mounted within the annular ring 22.

FIG. 8 illustrates a further modified inner ring 12b including a spiral hoop of fiber optic cable 25 imbedded throughout the translucent ring 22. The spiral hoop 25 produces increased illumination due to the compacting of the ring for use in an embroidery procedure.

FIG. 9 illustrates a further modified inner hoop ring 12c defined by a translucent inner hoop ring 26 including a hollow central cavity 27 formed throughout, with the spiral hoop of fiber optic cable mounted within the cavity 27. This permits compression or tensioning of the ring to increase or decrease the density of the spiral ring of fiber optic cable 25 throughout the annulus and thereby permit varying of lighting to an overlying fabric web 16.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A lighted embroidery hoop apparatus comprising, an outer hoop ring securable in a surrounding relationship to an inner hoop ring, the inner hoop ring including illumination means mounted therewithin for directing artificial light to illuminate a fabric mounted on said embroidery hoop.

2. An appartus as set forth in claim 1 wherein the inner hoop ring includes an interior annular surface, the interior annular surface including spaced, elongate openings directed from the interior annular surface and communicating with a central cavity, said cavity coextensively directed within the inner hoop ring the inner hoop ring, and the illumination means including an illumination bulb mounted within each opening, and an electrical transmission cable electrically communicating with each of the illumination bulbs.

3. An apparatus as set forth in claim 2 wherein the electrical transmission cable is directed through the central cavity, and a battery pack mounted to the inner hoop ring to direct current selectively through the electrical transmission cable to each of the illumination bulbs.

4. An apparatus as set forth in claim 1 wherein the inner hoop ring is formed of a polymeric, translucent material.

5. An apparatus as set forth in claim 4 including a fiber optic cable mounted coextensively throughout the inner hoop ring.

6. An apparatus as set forth in claim 5 including a battery pack and an illumination bulb mounted exteriorly of the inner hoop ring to direct selective illumination to the fiber optic cable for illumination of the fiber optic cable and transmission of illumination from the fiber optic cable through the translucent inner hoop ring.

7. An apparatus as set forth in claim 6 wherein the fiber optic cable is defined as a continuous spiral of cable mounted within the inner hoop ring.

8. An apparatus as set forth in claim 7 wherein the inner hoop rings includes a central cavity throughout the inner hoop ring, and the spiral ring of fiber optic cable is mounted within the cavity to enable compression or extension of the fiber optic cable within the cavity to vary intensity of light directed from the fiber optic cable.

* * * * *